United States Patent
Gupta et al.

(10) Patent No.: US 11,496,519 B1
(45) Date of Patent: Nov. 8, 2022

(54) MANAGING SECURITY IN ISOLATED NETWORK ENVIRONMENTS

(71) Applicant: Amazon Technologies, Inc., Reno, NV (US)

(72) Inventors: Diwakar Gupta, Seattle, WA (US); David Wachtfogel, Jerusalem (IL); Marc Stephen Olson, Bellevue, WA (US); Anthony Nicholas Liguori, Bainbridge Island, WA (US); Stephen David Hildrey, Liverpool (GB)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 16/699,320

(22) Filed: Nov. 29, 2019

(51) Int. Cl.
*H04L 9/40* (2022.01)
*H04L 9/08* (2006.01)

(52) U.S. Cl.
CPC ............ *H04L 63/20* (2013.01); *H04L 9/0872* (2013.01); *H04L 9/0891* (2013.01); *H04L 63/045* (2013.01); *H04L 63/108* (2013.01); *H04L 63/1416* (2013.01); *H04L 63/1441* (2013.01)

(58) Field of Classification Search
CPC ..... H04L 63/20; H04L 9/0891; H04L 9/0872; H04L 63/1441; H04L 63/108; H04L 63/1416; H04L 63/045
See application file for complete search history.

(56) References Cited

U.S. PATENT DOCUMENTS

| | | | |
|---|---|---|---|
| 10,205,594 B1* | 2/2019 | Kaufman | H04L 9/0822 |
| 2005/0114688 A1* | 5/2005 | Leis | G06F 21/62 |
| | | | 713/193 |
| 2015/0261951 A1* | 9/2015 | Abuelsaad | G06F 21/554 |
| | | | 726/22 |
| 2017/0060595 A1* | 3/2017 | Keidar | G06F 21/62 |
| 2018/0006815 A1* | 1/2018 | Young | H04L 9/0819 |
| 2018/0063081 A1* | 3/2018 | Cilfone | H04L 63/1433 |
| 2019/0173675 A1* | 6/2019 | Kaufman | H04L 9/0894 |
| 2019/0325171 A1* | 10/2019 | Obermaier | G06F 21/73 |
| 2020/0120108 A1* | 4/2020 | Jain | H04L 63/1416 |

* cited by examiner

*Primary Examiner* — Cheng-Feng Huang
(74) *Attorney, Agent, or Firm* — Hogan Lovells US LLP

(57) ABSTRACT

Security can be provided for data stored using resources that are deployed in an environment managed by a third party. Physical and logical detection mechanisms can be used to monitor various security aspects, and the resulting security data can be used to identify potential threats to these resources. In some embodiments, suspicious activity can cause resources such as data servers to be automatically and remotely rebooted such that keys stored in volatile memory on those data servers will be lost from those servers, such that an attacker will be unable to decrypt data stored on those servers. Once a determination of safety is made, the keys can be provided to the respective data servers such that data operations can resume.

15 Claims, 11 Drawing Sheets

MANAGING SECURITY IN ISOLATED NETWORK ENVIRONMENTS

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems. This capacity may be located in various locations that are managed by different entities, however, which can raise concerns about security.

BRIEF DESCRIPTION OF THE DRAWINGS

Various embodiments in accordance with the present disclosure will be described with reference to the drawings, in which.

DETAILED DESCRIPTION

Figure 1:
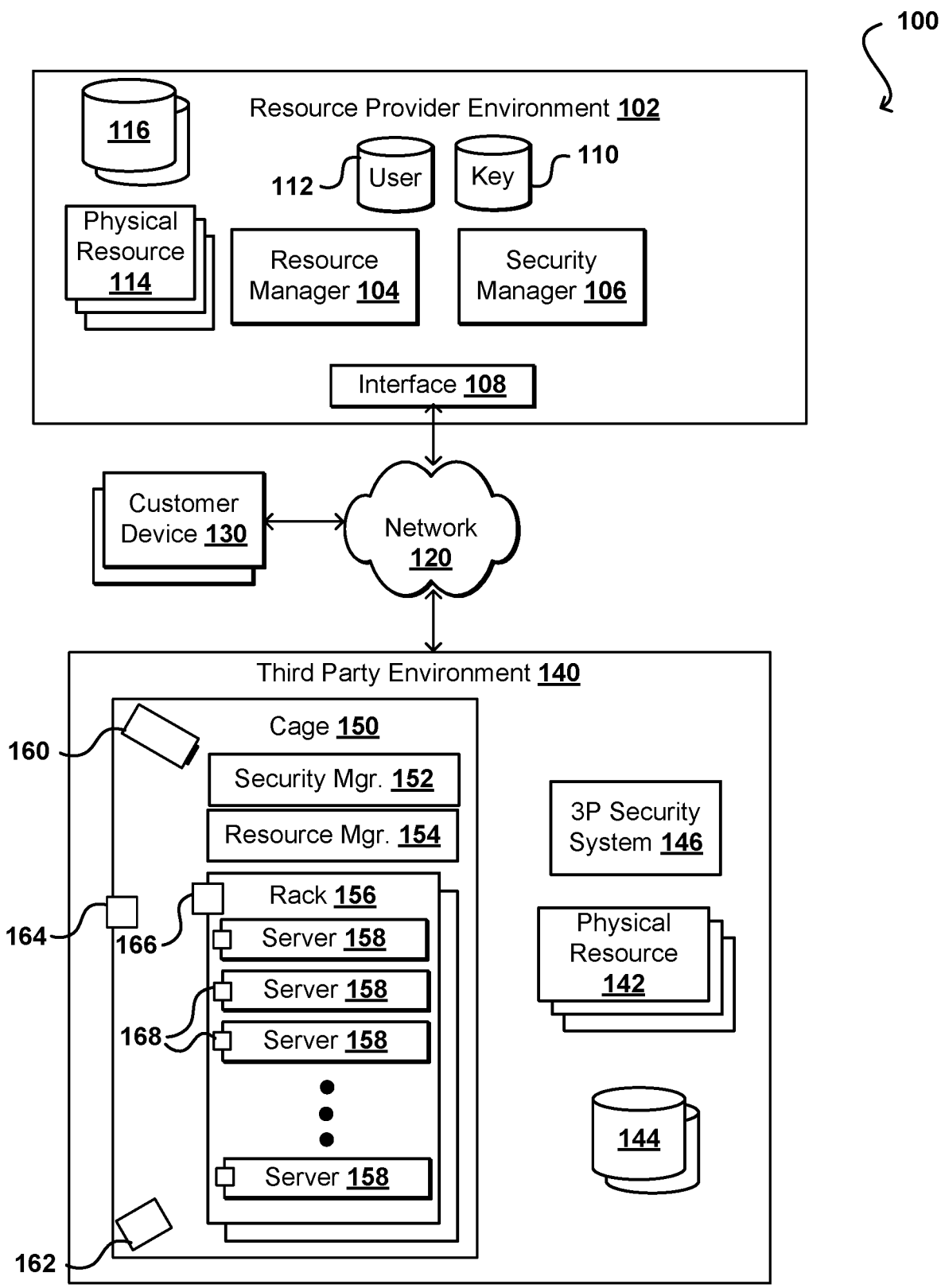
FIG. 1 illustrates an example system for providing virtual resources to a customer that can be utilized in accordance with various embodiments.

The present disclosure relates to methods, apparatus, systems, and non-transitory computer-readable storage media for increasing security for cloud service provider substrate extension resources. A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands. Cloud computing can thus be considered as both the applications delivered as services over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

In some instances a cloud provider may want to deploy physical resources in a particular region, and may contract with a third party to enable those physical resources to be deployed in a given location. It will often be the case, however, that the cloud provider will not have control over the security of this location. Accordingly, the cloud provider may provide additional physical (and logical) security mechanisms that can monitor for suspicious or unapproved activity with respect to the resources. In some embodiments, the resources may be deployed in a protected area, such as inside a metal cage with locks and tamper sensors. There may be cameras and motion sensors deployed to detect motion or objects in this case, as well as various sensors for detecting movement or tampering. Individual racks or servers in the deployment may also have security mechanisms, such as tamper-evident tags. Security data from these physical devices, as well as data from other physical devices for the location offered by the third party, may be analyzed to attempt to determine potential or actual threats, or suspicious activity, with respect to any aspect of the deployment. In some embodiments there may be logical security mechanisms in place as well, to attempt to determine digital or virtual attacks, etc.

In some embodiments the data from the various security mechanisms can be used to calculate a value such as a health score or risk score. If this score falls outside an acceptable range, a determination can be made that there is a security threat and one or more remediations should be performed. In some embodiments, this includes determining potentially impacted resources and rebooting those resources. For resources such as data servers, data such as customer data may be encrypted using an encryption key that is stored locally in volatile memory. A rebooting of the server would cause this key to be lost from volatile memory, such that an attacker would not be able to decrypt the customer data. Once it is determined, based at least in part upon the security data, that the deployment is safe or not under active threat, the keys can be re-transmitted to the impacted servers to enable the customer data to again be accessed from those devices. Appropriate notifications and alarms can be provided for various types of actual or potential attacks, and in some cases there may be various options provided for remediating the attack.

Various other applications, processes, and uses are presented below with respect to the various embodiments.

FIG. 1 illustrates an example configuration 100 that can be utilized in accordance with various embodiments. This example configuration includes a resource provider environment 102 (or "cloud" environment) and a third party environment 140. Various other types of environments can be utilized as well as discussed elsewhere herein, such as lower security environments or environments where a resource provider does not have control over various security mechanisms, among other such options. These environments can be managed by a resource provider, customer, or third party provider, among other such options. In some embodiments, the environment may be provided by the resource provider but may have a lower security level than is to be used for a particular resource deployment within that environment. In some embodiments, environment 140 could be contained within resource provider environment 102. In some embodiment a secured deployment could be managed by a resource provider on behalf of a customer, even if the secured deployment is located within an environment controlled by the customer.

As mentioned above, a customer may have an account with a resource provider, or cloud provider, to store and/or process data using various cloud resources. In some embodiments customer data may be hosted or processed using physical resources 114, 116 of the resource provider environment. Since these physical resources are located within the resource provider environment 102, over which the resource provider has complete control, the resource provider can be sure that various security mechanisms are in place, as may be managed by a security manager 106 system or service in that environment. It might be the case, however, that at least some of the physical data for a customer may be located external to the resource provider environment 102.

For example, a cloud provider might contract with a third party to host resources in a specific location. If a cloud provider hosts data for customers in various locations, it can be desirable to host that data locally to those customers for at least performance reasons, such as to reduce latency of data transmission. It may not be practical or desirable, however, for a cloud provider to purchase real estate to set up data centers at these various location, which would require the purchase, management, and maintenance of various physical devices. In some instances, a cloud provider may contract with a third party to have at least some resources placed in a third party environment 140, such as a server farm or data center owned or managed by a third party. In some embodiments this environment may be owned or controlled by a customer having data hosted by the cloud provider. In any of these situations, at least some level of access or security of the third party environment will be out of the control of the cloud provider.

For example, a third party environment will often have its own physical security mechanisms in the environment, as may relate to locks, cameras, sensors, and the like. These security mechanisms can feed into a third party security system 146, which in at least some embodiments can send information about potential security breaches or other security events to the cloud provider and/or impacted customers. It will often be the case, however, that the cloud provider will not have control over the security of the third party environment. For resources housing customer data, proper security can be vital to the cloud provider business. While in at least some instances there will be some level of agreement as to security measures to be put in place, the cloud provider may not have the ability to inspect or verify that these measures are in place and functioning properly. Thus, the cloud provider may wish to provide at least some level of additional security to protect its resources in the third party environment 140.

In this example, there may be a number of physical servers 158 hosted in a number of server racks 156 and managed by one or more resource managers 154 as discussed in more detail elsewhere herein. In order to restrict access to these resources, the resources may be placed in a cage or other access-restricting mechanism. A cage in one embodiment is a fenced-in environment with a locked door or gate, such that physical access to the racks and servers 158 for the cloud provider is only available to an authorized party having a key to a lock 164 or other access control mechanism of this cage 150. In some embodiments, a cage can be a metal cage positioned on a floor of a data center managed by a third party. While an employee of the third party may have access to third party resources 142, 144, they are restricted from accessing cloud provider resources inside the cage unless provided with such access.

In this example, a cage 150 can have various security mechanisms, which can feed into a cloud manager-specific security manager 152 within the cage 150. The cage can have a lock 164 or other access detection mechanism on a door or entry into the cage 150. When the lock is unlocked, or access is able to be obtained through a door that has been opened, information can be sent to the security manager 152. There can also be one or more access detection mechanisms such as cameras 160 or motion detectors 162 which can detect motion within, or potentially near, the cage 150. Any motion or movement may cause data to be sent to the security manager 152, and in the case of a camera video or image data can be captured that can be stored or transmitted to the security manager or resource provider environment. Other mechanisms such as audio or infrared detectors can be used as well in various embodiments.

In at least some embodiments, there can be additional security mechanisms on the individual resources as well. For example, there can be tamper-evident tags 168 or sensors on the individual servers 158, as well as similar sensors 166 on the racks themselves. In some embodiments these devices can be network-enabled devices that are able to transmit data to the security manager 152 upon any tampering or physical access. In other embodiments, a camera 160 can capture image data that can be analyzed to determine whether the tags remain intact or show evidence of tampering. Other security elements can be used as well, as may include individual locks, touch sensors, and the like.

In various embodiments, data from these various security mechanisms for a given cage 150 can be fed to a security manager 152 in the cage 150 or a security manager 106 in the resource provider environment. In some embodiments, detection of certain security events such as unauthorized access by a person in the cage can be enough to trigger an alarm or security review. In other embodiments, detection of security events such as motion within a cage may be enough to trigger further investigation, such as a notification to security personnel or a request to a security application to analyze video data to attempt to determine a cause of this motion. In some embodiments, there may be a security score or threshold that must be violated for action to be taken. Each security mechanism can have, or generate, a certain score, and the scores for the various security mechanisms can be added up to determine whether the security risk exceeds an acceptable threshold, or whether a security score health falls below a specified threshold, among other such options. In some embodiments, the thresholds may vary by factors such as type of location, type of resource impacted, type of data impacted, etc. In some embodiments, certain actions such as detection of a broken lock or detection of an unauthorized person accessing a server storing customer data may have a high enough score to trigger an alarm or security event regardless of the values of other security mechanisms.

As mentioned, detection of a breach (or potential security breach) may cause certain security actions to occur, such as to sound a security alarm or to dispatch security personnel to the location of the breach. There will be some latency in these actions, however, as it will take some time for personnel to react to the alarm or notification, during which time an attacker could potentially make off with, or corrupt, customer data stored on those servers 158. Accordingly, approaches in accordance with various embodiments can attempt to further protect customer data on these servers 158, or other such resources, using encryption keys or other such digital security mechanisms. In at least one embodiment, customer data stored on a given server 158 may be encrypted using a symmetric encryption key. A given symmetric key can be used to encrypt data to be stored, persistently or temporarily, on one of more of the servers 158 in the third party environment. Keys can be provisioned per server, per rack, per cage, per customer, or according to another appropriate grouping. In at least one embodiment, a key is provisioned by a security manager 106 (directly or through a key service) and a copy of that key is stored in a key repository 110 in the resource provider environment. The key will be transmitted to the relevant server 158 for decrypting encrypted customer data, but the key will not be stored in persistent memory but will instead be stored in volatile memory, such as RAM on a server. Storing a key in volatile memory will cause that key to be lost or deleted upon a reboot or similar action. When a potential security breach is detected, a security manager 152 can work with a resource manager 154 in the third party environment to cause an impacted server to reboot. Depending upon a type or scale of breach, there may be more than one server instructed to reboot, and in some embodiments the reboot instruction may come from a security manager 106 or resource manager 104 in the resource provider environment. When the impacted server is rebooted, the relevant key will no longer be available on that server such that customer data cannot be accessed even if physical access to that server is obtained. Further, the reboot action in and of itself will provide time for personnel to arrive at the resources to attempt to determine and deal with any actual intrusion.

In some embodiments, a server during reboot can request or obtain the key from the security manager 106 or key service. In some embodiments the key may be provided automatically during this process. In some embodiments, depending at least in part upon the type of threat or threat score, for example, a key may not be provided right away but may instead be held until the threat is cleared. In this way, data on a given server is protected until the threat or breach can be dealt with, or at least until there is no longer danger of data loss or corruption. In such a situation, a security manager 152, 106 in either embodiment can request or instruct the symmetric key for that server, or relevant data, to be sent to that server to enable normal data operations to resume with respect to that data.

In some embodiments, a resource provider environment or "cloud" environment (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network), for example by way of a transit center that may be co-located at other network provider facilities (e.g., Internet service providers, telecommunications providers) and securely connected (e.g. via a VPN or direct connection) to the availability zones. A region may operate two or more transit centers for redundancy.

The cloud provider network can include a physical network (e.g., sheet metal boxes, cables, rack hardware) referred to as the substrate. The substrate can be considered as a network fabric containing the physical hardware that runs the services of the provider network. The substrate may be logically isolated from the rest of the cloud provider network, for example it may not be possible to route from a substrate network address to an address in a production network that runs services of the cloud provider, or to a customer network that hosts customer resources. Logical isolation is a configuration that prevents sets of computing resources, which share a common physical network infrastructure, from being able to communicate with each other. For example, two logically-isolated devices can be physically connected to the same network, but to enforce the logical isolation a protocol or device can be used to prevent them from communicating with one another. Logical isolation can apply to sets of physical devices and/or virtualized computing resources.

The cloud provider network can also include an overlay network of virtualized computing resources that run on the substrate. As such, network packets can be routed along the substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

In at least one embodiment, a key management service can be used with the security manager 106 whereby a private key is stored in a key repository 110 and a public key is used to encrypt, or re-encrypt, data at a rack 156 in a third party environment. In some embodiments this key can be used to encrypt a local key within the third party environment 140. In some embodiments this key may be managed by a security manager 152 in the third party environment, but within the cage 150 or controlled environment of the cloud provider. In some embodiments, multiple keys can be used to help stripe the keys. In some embodiments, multiple keys or multi-factor authentication (MFA) can be used in order for a key to be vended. In other words, portions of a number of keys may be needed, or verification by a separate system or service may be needed to access customer data on that rack. As mentioned, in even of a breach a reboot of a server can be performed, and the key(s) provided at an appropriate time to enable access to the decrypted customer data. There may be other actions or remediations taken as well depending upon the severity of the breach, where those actions may include destroying local keys and data, removing local keys, or marking available resources and data as read-only. In some embodiments, a remediation can include capturing a snapshot representing a current state of customer data on a server, then storing that snapshot to a secure location and deleting all data on that compromised server.

In at least one embodiment, each cloud server 158 that boots up in this third party environment 140 must request the appropriate key from the security manager 106, or other key service. In at least some embodiments the security manager 106 must first verify, through communication with the security manager 152 in the third party environment, that there is currently no security threat that would prevent the key from being sent to the server. As mentioned, there may be a health or security score generated for cloud resources in the third party environment 140 at any time, and in some embodiments the security manager 106 must verify that the health or security score is at an appropriate value before sending a key to a cloud server in that environment. If not, the security manager 106 can wait until indication is received that it is safe to send the key, at which point the key can be provided to the relevant servers. This check can be performed at initial boot of a rack of servers, as well as for any subsequent reboot of one or more of these servers. In at least some embodiments, the check can be performed for the entire cage, nearby racks, or other servers in that environment to determine a state of the environment before sending a key, even if the server to receive the key otherwise satisfies the criteria for receiving a key. In some embodiments a server will receive a key through an API, while in other embodiments the key may be sent directly from a responsible security manager.

In at least one embodiment, information for an alarm or potential breach can be sent to a security manager 106 in the resource provider environment. In some embodiments this information will relate to the type of alarm(s) so that the security manager 106 can make a decision on remediation, while in other embodiments a security manager 152 in the protected portion of the third party environment 140 can make the determination and then send information about one or more servers that have been, or may have been compromised. In various embodiments, the security manager 106 can then determine an appropriate action to take, as may be based on the type of server, data stored on the server, security score, and the like. In some embodiments the security manager 106 can remotely instruct a reboot of one or more impacted servers 158. As mentioned, a reboot will cause the key to be deleted from the server, which will effectively remove the customer data from the machine such that an attacker who has physical access to that machine will not be able to regain or decrypt the customer data since the attacker will not have access to the necessary key.

In some embodiments data from security mechanisms of the third party environment 140 may also be utilized in determining whether to take a remediation action for a potential breach. For example, a security manager 106 might receive an alarm triggered by a tamper detection mechanism, fire alarm, motion detector, or other device or sensor managed by the third party provider. Since the cloud provider may not know whether these devices can be trusted, the cloud provider can analyze this third party data in conjunction with data from its own security devices. It might be the case, however, that the cloud provider's security devices fail, or at least fail to detect a potential breach, such that the cloud provider can determine to take at least some action in response to an alarm or notification from the third party security system. In some embodiments all of this information can be used to calculate a health or risk score, which can be used to determine whether to take action for a potential breach.

In some embodiments the types of actions taken for specific types of events might change over time. For example, during an initial phase after deployment a more conservative approach might be taken until a determination can be made as to which sensors are likely to give false alarms, how heavily certain values should be weighted in the overall health score, etc. During this initial phase, lower security risks might result in reboots for added security. Additional checks may also be required before allowing keys to be provided to servers after reboot. Over time, certain alarms or data types might be removed from consideration or weighted less heavily, or an overall acceptable health or risk score might change as more data is obtained for this location. In some embodiments machine learning may be utilized, which may continue to be re-trained over time with additional data, and the inferred risks or actions may change over time for similar types of input.

As mentioned, in some embodiments keys can be stored in RAM or other volatile memory that requires power to maintain stored data, such that keys will be lost upon a reboot or restart. In some embodiments this key or credential information can be stored in other locations as well. For example, symmetric key data can be stored in internal registers, such as an SSE or XMM register, which can provide some additional protection in case of a physical attack. By placing data in SSE registers, certain attacks such as RAM freezing would fail to gain access to these keys, and thus the corresponding decrypted customer data. An advantage to using SSE registers is that SSE has to be reset in order to communicate, and this resetting would cause the registers to be cleared such that the key data would not be accessible.

In some embodiments, keys may be rotated or may have limited lifetimes to provide a further level of protection. In some embodiment the lifetime of a key may depend at least in part upon a level of trust of the environment in which the key is being used. Such an approach can require a re-encryption of customer data, however, such that it may not be appropriate for all situations. It should be noted that data other than customer data can be encrypted and stored by such resources, and that entities associated with this data may also want some control, or at least notification, of actions being taken to protect their data. In some embodiments any remediation can come with a notification to the relevant entity or customer in order to inform them of the potential breach, as well as any action being taken to protect their data, particularly if this action results in a temporary unavailability of that data.

Figure 2A:
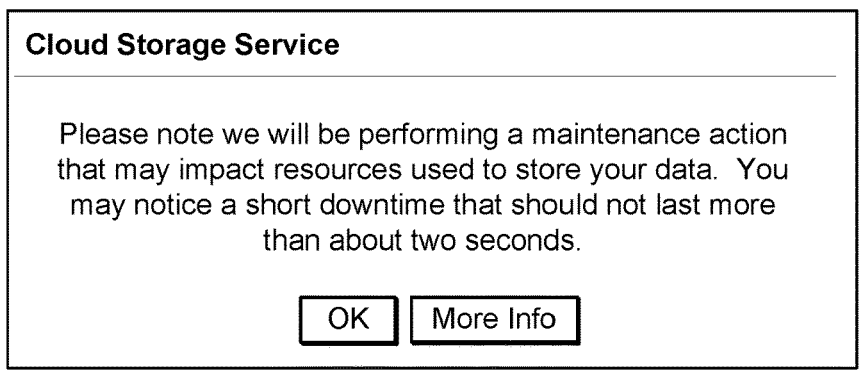
FIGS. 2A, 2B, and 2C illustrate example notifications that can be generated in accordance with various embodiments.
Figure 2B:
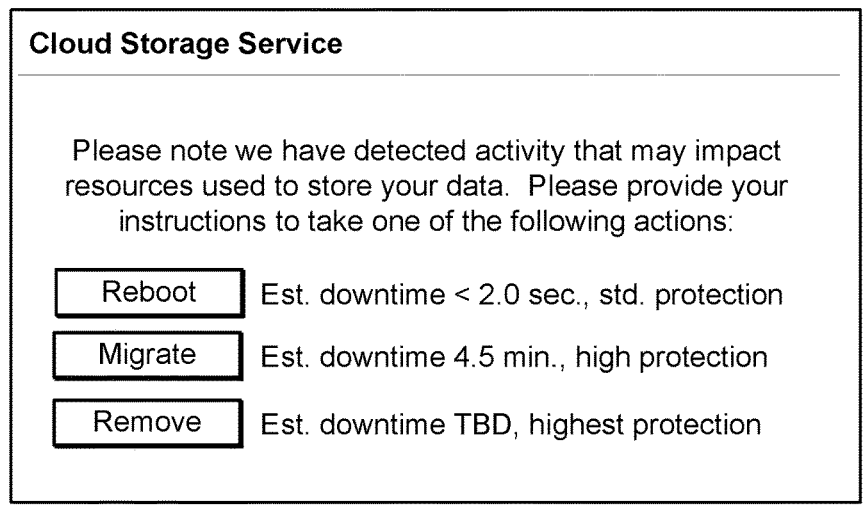

FIGS. 2A and 2B illustrate example notifications that can be provided to a potentially impacted customer, or other such entity, in accordance with various embodiments. In the example notification 200 illustrated in FIG. 2A, an entity having data stored (persistently or temporarily) on a potentially impacted server can be notified of a maintenance action to be performed in response to detecting the suspicious activity. Entities such as security personnel might have additional information provided regarding the suspicious activity, in order to be able to take appropriate action where necessary. In some instances specifics about the activity may be provided. In this example, the action being taken is specified, here rebooting of certain servers. This notification also indicates to the entity a duration or extent of the impact, which in this example will cause a downtime of impacted data servers for about two seconds or less. In this way, the entity can be ensured that security is being actively enforced, and can be notified in advance of a short unavailability. The notification can also provide an option for the entity to obtain additional information or request another action be taken, among other such options.

The example notification 240 of FIG. 2B provides information about suspicious activity to a potentially impacted party, such as an entity who is leasing or utilizing one or more of those impacted servers. In this example, there may be various options available from which this entity can select. Information about each option may also be provided. For example, an entity can have an option to request a reboot of an impacted server that will take about two seconds or less, and will provide a standard level of security (at least for this deployment) against a potential breach. The entity can also have an option to migrate that entity's data to another server, or set of servers, which can be more secure but may also require more significant downtime or unavailability of that data. The entity can also have an option to cause that data to be removed from any servers in that environment. In some instances the data will be snapshotted and this snapshot may be stored in a determined location to allow for data restoration, but under this option the entity data will no longer be available in the impacted region or deployment. Various other options or notifications can be provided as well within the scope of the various embodiments. The entity in such an embodiment can have control over other aspects as well, such as a type of key to be used, lifetime of the key, etc., as discussed in more detail elsewhere herein. An entity may also be able to choose different actions for different resources, such as whether to update keys or migrate data for specific subsets of impacted resources.

Figure 2C:
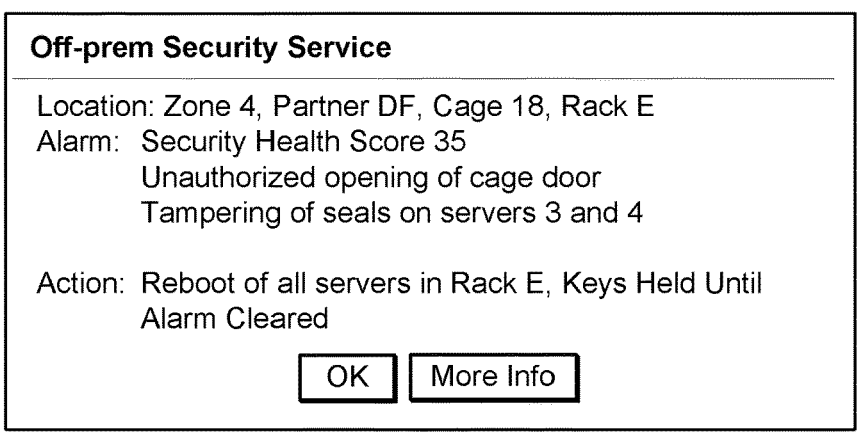

Notifications or alarms can also be provided to personnel associated with a security service, either of the cloud provider or the third party provider, or both. A notification 280 illustrated in FIG. 2C provides information about a location of the security threat, here indicating a region, partner provider identity, cage, and rack for the threat. This notification also provides a current security health score that caused the notification to be generated, and provides information about specific security data that is associated with the threat, here unauthorized opening of a cage door and detected tampering of seals on two servers. In this example the notification specifies an action that was taken automatically in response to detection of the threat, but in other embodiments a notification or alarm might provide options for mitigating the threat, etc.

Figure 3:
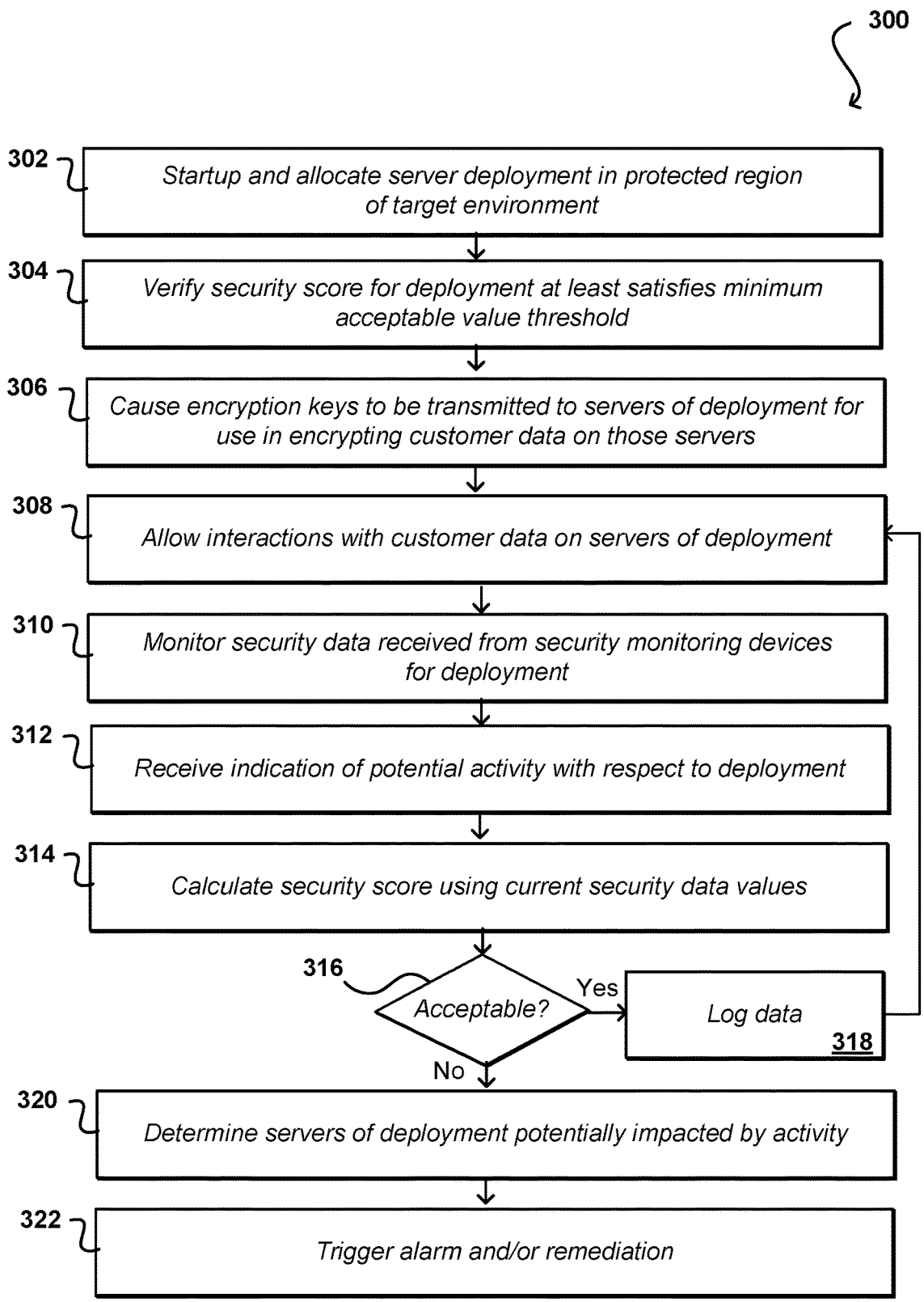
FIG. 3 illustrates a process for determining potentially suspicious activity in a remote resource environment that can be utilized in accordance with various embodiments.

FIG. 3 illustrates an example process for determining a potential security breach in an isolated network environment that can be utilized in accordance with various embodiments. It should be understood that there can be additional, fewer, or alternative steps performed in similar or alternative orders, or in parallel, within the scope of the various embodiments unless otherwise specifically stated. In this example, servers of a server deployment are started up 302 and allocated for use by entities, such as customers. In this example, the deployment is in a protected region of a target environment, where the target environment could be a remote environment, a customer environment, or an environment managed by a third party, among other such options. The protection region can include a deployment of resources in a cage, for example, with security mechanisms in addition to those of the target environment, which may also be controlled by an entity such as a customer or a third party provider. In other embodiments, the target environment could be any environment in which a lower level of security is enforced than is to be used for the protected region. In such an environment, a cloud provider of the servers may not have control over the security of the remote or isolated environment. Once the servers are up and running, security data for the deployment can be captured and analyzed in order to verify 304 that a security score for the deployment at least satisfies a minimum acceptable threshold. There can be other criteria utilized as well that must be at least satisfied by the deployment before the deployment can be used for live (or otherwise to-be-protected) data. Once it is verified that the deployment satisfies relevant security criteria, encryption keys can be caused 306 to be transmitted to respective servers of the deployment for use in encrypting customer data on those servers. As mentioned, there can be different keys for each rack, server, customer, partition, etc., or keys can be used across servers in some embodiments. The keys can be stored in RAM or internal registers in at least some embodiments. Once the keys are stored on the relevant servers of the deployment, interactions with customer data can be allowed 308 on, or with respect to, those servers. In some embodiments there may be multiple layers of keys for a given resource. For example, data for an instance might be encrypted with a first key, while the instance itself utilizes a second key for data encryption. A data storage volume might also have its own key. In various embodiments, one or more of these keys may be stored or managed as discussed herein such that the data will be unable to be decrypted in the event of a resource reboot or other such action.

In this example, security data received from physical and/or logical security monitoring devices for the deployment can be monitored 310. This can include, for example, receiving data from physical security mechanisms provided for the deployment by the cloud provider, as well as data from physical security mechanisms for the isolated environment provided by the third party provider. This can also include data from logical security mechanisms executing on servers or other components of the deployment. This data can be analyzed to attempt to determine whether or not an action or event has happened that may be indicative of a security breach or threat. This data can include, for example, opening of a cage door, motion inside a cage, tampering with a physical server, and the like. In response to such action, an indication of potential activity can be received 312 with respect to the deployment. In response to this indication, or at regular intervals or in response to other such triggers, a security score can be calculated 314 using the current security data values obtained from the security mechanisms. This can be a health score, risk score, or other such determination. The score can be compared against one or more security thresholds, for example, to determine 316 whether the current score is acceptable for continued usage for customer data or other such processing or storage. If so, data for the event can be logged 318 and the process can continue. If, however, it is determined that the current score is not acceptable per current rules, thresholds, policies, or other criteria, then the servers of the deployment that are potentially impacted by the activity can be determined 320. This can be a determination of servers that were directly impacted, or that may be indirectly impacted in various embodiments. In this example, an alarm and/or notification can then be triggered 322 or generated in response to the determination, whereby a remediation can be taken as appropriate.

In at least some embodiments, encryption keys provided to servers in a protected deployment may also have one or more lifetimes specified. A watchdog mechanism can be deployed within various deployed servers, which will periodically receive a renewal or authorization from a remote management service. If the watchdog mechanism does not detect a renewal or authorization within a determined period of time, the watchdog mechanism can trigger a watchdog reset, which can comprise causing the respective server to reboot itself, whereby the relevant encryption key will be lost. In this way, customer data is protected even if an attack prevents a remote reboot from a management service, as the server can reboot itself if an external key renewal is not received. In some embodiments, a length of time that a server can wait to receive an authorization before initiating a reboot can vary based upon various factors, as may include a current security health or a type of data being stored, among other such options.

Figure 4:
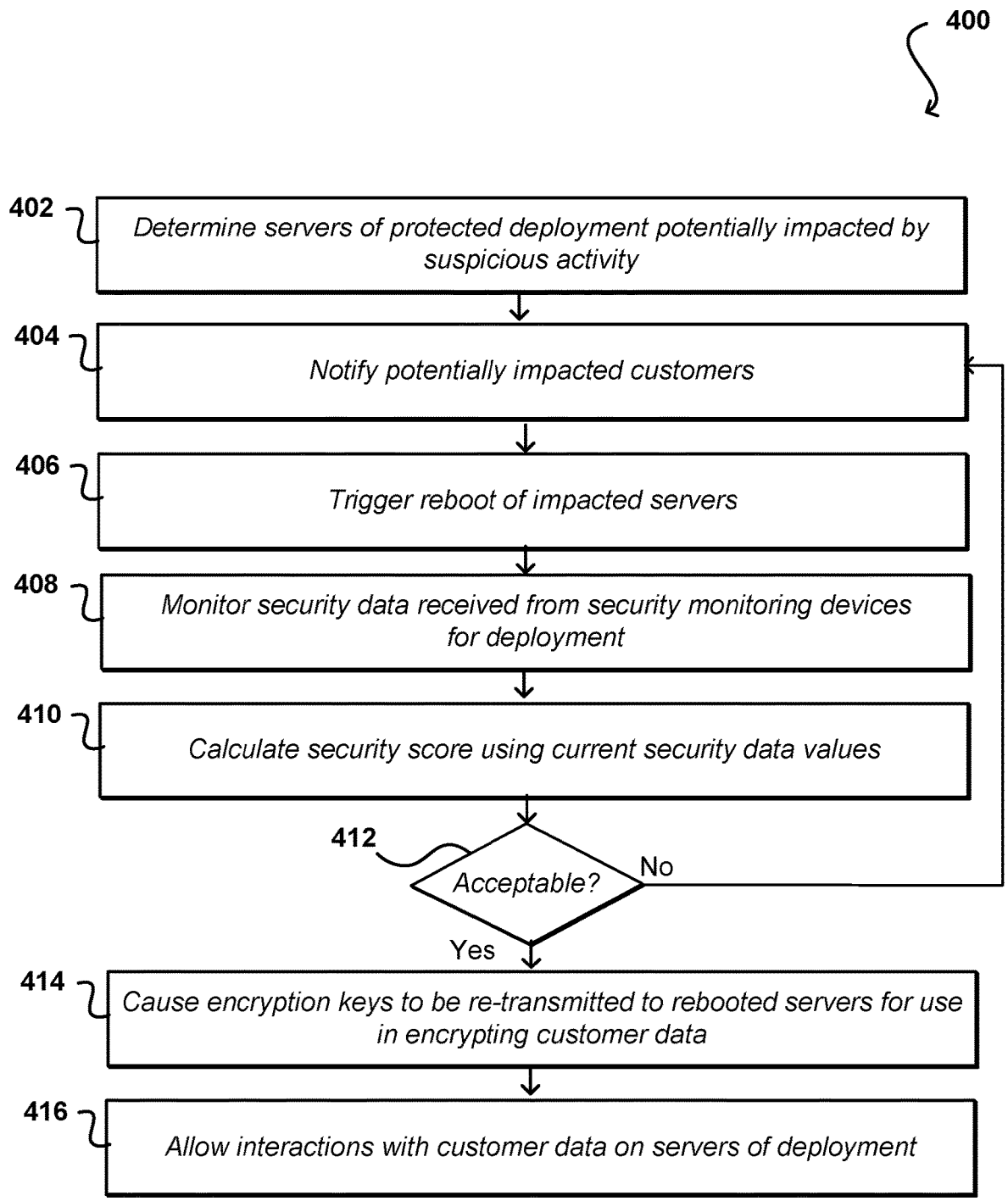
FIG. 4 illustrates a process for performing remediations for potentially suspicious activity in a remote resource environment that can be utilized in accordance with various embodiments.

FIG. 4 illustrates an example process 400 for performing such a remediation that can be utilized in accordance with various embodiments. In this example, servers that are potentially impacted by suspicious activity in a protected deployment are determined 402, such as by using a process described with respect to FIG. 3. In this example, potentially impacted customers are notified 404 before, or concurrently with, any action being taken such that the customers (or other impacted parties) will not be surprised by the action or any impact of the action on availability. As mentioned, in some embodiments notified parties may also be able to request that certain actions, or types of actions, be taken with respect to their data or applications. In this example, determination of a potential (or actual) security breach or threat impacting these servers can result in the triggering 406 of a reboot of the impacted servers, where the rebooting can be automatic or approved by authorized security personnel, among other such options. As mentioned, a rebooting of these servers will cause a local copy of any encryption key to be lost, which will prevent an attacker from decrypting any customer data potentially exposed during an attack.

In this example, security data is available from multiple physical and/or logical security devices that can determine data for potential or actual security threats to these and other servers at the protected location. This security data can be monitored 408 during, and after, the reboot (which may include a self-initiated reboot by a watchdog mechanism in some embodiments), and this data can be used to calculate 410 a current security score using the obtained security data. In some embodiments security personnel may also be tasked to investigate the deployment to ensure that there is no active physical threat to the deployment. If it is determined 412 that the security score is not in an acceptable range, or that it is not yet determined to be safe to utilize the impacted servers, then the monitoring can continue without customer data being accessible from the impacted servers. Once it is determined that the security score is in the acceptable range, or the threat is no longer active, any outstanding alarms can be turned off and respective encryption keys can be caused 414 to be re-transmitted to the rebooted servers for use in encrypting and decrypting customer data. These keys can be transmitted from a key management service in some embodiments, or at least from a key source that is outside the third party environment. Once the keys are available on the respective servers and the site is again secure, interactions with customer data can be allowed 416 on the various servers of that deployment.

In some embodiments, an attack on one or more servers may raise a threat level for other servers in a deployment. In at least one embodiment, an active or suspected attack may factor into the health or security score of other components in a deployment, as well as the overall deployment. In some embodiments, detection of a potential attack to one or more servers may cause new launches to be paused for that deployment until the attack has been cleared, in order to minimize a potential scope of the attack. In some embodiments additional workloads would not be allowed to execute until the deployment is deemed secure again. In some embodiments, this monitoring and remediation service may be offered by an entity other than a cloud provider as well, such as where a cloud provider may want to provide additional security for resources deployed at a third party location.

In some embodiments, aspects of a cloud provider network—referred to herein as a provider substrate extension (or "PSE")—can be provisioned within a network that is independent from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, at a separate cloud provider-managed facility, at a communications service provider facility, or other facility including servers wherein such server(s) communicate over a network (e.g., a publicly-accessible network such as the Internet) with a nearby availability zone or region of the cloud provider network. Customers may access a provider substrate extension via the cloud provider substrate or another network, and may use the same application programming interfaces (APIs) to create and manage resources in the provider substrate extension as they would use to create and manage resources in the region of a cloud provider network.

As indicated above, one example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed by the cloud provider but that includes data plane capacity controlled at least partly by a remote/distinct control plane of the cloud provider network.

In some embodiments, another example of a provider substrate extension is a network deployed at a communications service provider. Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, and autonomous vehicles.

As used herein, the computing resources of the cloud provider network installed within a communications service provider network are sometimes also referred to as "cloud provider network edge locations" or simply "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a data center site.

Figure 5:
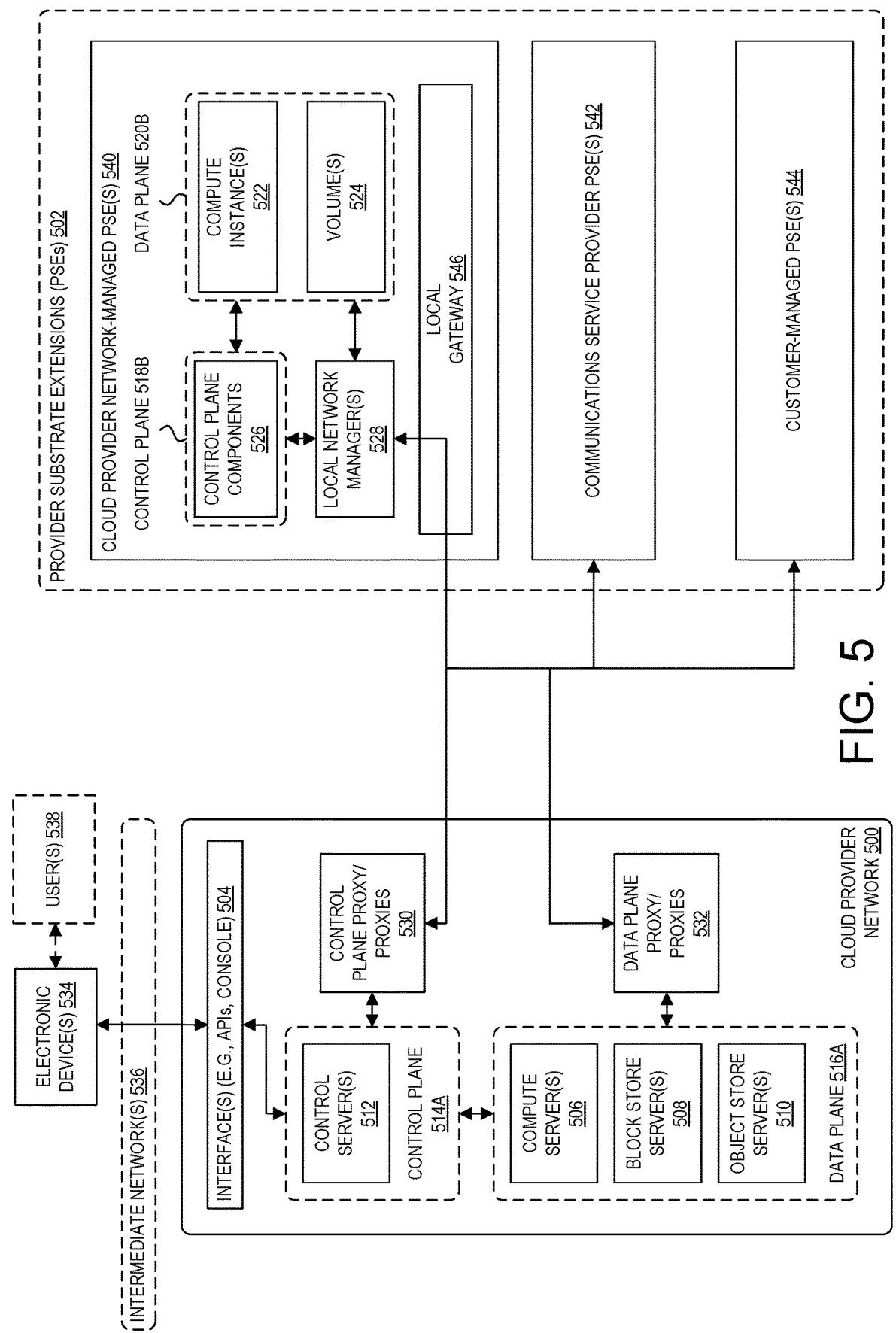
FIG. 5 illustrates an exemplary system including a cloud provider network and further including various provider substrate extensions according to some embodiments.

FIG. 5 illustrates an exemplary system including provider network substrate extensions at which computing resources can be deployed by customers of a provider network according to some embodiments. A cloud provider network 500 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 538) can connect to virtualized computing devices and other cloud provider network 500 resources and services using various interfaces 504 (e.g., APIs) via intermediate network(s) 536. An API refers to an interface and/or communication protocol between a client (e.g., an electronic device 534) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 500 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 500, for example it may not be possible to route from a substrate network address to an address in a production network that runs services of the cloud provider, or to a customer network that hosts customer resources.

The cloud provider network 500 can also include an overlay network of virtualized computing resources that run on the substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 506, a block store server 508, an object store server 510, a control server 512) can have an IP address in the substrate network. Hardware virtualization technology can enable multiple operating systems to run concurrently on a host computer, for example as virtual machines (VMs) on a compute server 506. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 500. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

As illustrated, the traffic and operations of the cloud provider network substrate may broadly be subdivided into two categories in various embodiments: control plane traffic carried over a logical control plane 514A and data plane operations carried over a logical data plane 516A. While the data plane 516A represents the movement of user data through the distributed computing system, the control plane 514A represents the movement of control signals through the distributed computing system. The control plane 514A generally includes one or more control plane components or services distributed across and implemented by one or more control servers 512. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 516A includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 500 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 516A can include one or more compute servers 506, which may be bare metal (e.g., single tenant) or may be virtualized by a hypervisor to run multiple VMs (sometimes referred to as "instances") for one or more customers. These compute servers 506 can support a virtualized computing service (or "hardware virtualization service") of the cloud provider network. The virtualized computing service may be part of the control plane 514A, allowing customers to issue commands via an interface 504 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 516A can also include one or more block store servers 508, which can include persistent storage for storing volumes of customer data as well as software for managing these volumes. These block store servers 508 can support a managed block storage service of the cloud provider network. The managed block storage service may be part of the control plane 514A, allowing customers to issue commands via the interface 504 (e.g., an API) to create and manage volumes for their applications running on compute instances. The block store servers 508 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 516A can also include one or more object store servers 510, which represent another type of storage within the cloud provider network. The object storage servers 510 include one or more servers on which data is stored as objects within resources referred to as buckets, and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 502 ("PSE") provides resources and services of the cloud provider network 500 within a separate network, thereby extending functionality of the cloud provider network 500 to new locations (e.g., for reasons related to latency in communications with customer devices, legal compliance, security, etc.). As indicated, such provider substrate extensions 502 can include cloud provider network-managed provider substrate extensions 540 (e.g., formed by servers located in a cloud provider-managed facility separate from those associated with the cloud provider network 500), communications service provider substrate extensions 542 (e.g., formed by servers associated with communications service provider facilities), customer-managed provider substrate extensions 544 (e.g., formed by servers located on-premise in a customer or partner facility), among other possible types of substrate extensions.

As illustrated in the example provider substrate extension 540, a provider substrate extension 502 can similarly include a logical separation between a control plane 518B and a data plane 520B, respectively extending the control plane 514A and data plane 516A of the cloud provider network 500. The provider substrate extension 502 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers can be provisioned by the cloud provider for deployment within a provider substrate extension 502. As described above, the cloud provider network 500 may offer a set of predefined instance types, each having varying types and quantities of underlying hardware resources. Each instance type may also be offered in various sizes. In order to enable customers to continue using the same instance types and sizes in a provider substrate extension 502 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 500 and the cloud provider network provider substrate extension.

As illustrated, the provider substrate extension servers can host one or more compute instances 522. Compute instances 522 can be VMs, or containers that package up code and all its dependencies so an application can run quickly and reliably across computing environments (e.g., including VMs). In addition, the servers may host one or more data volumes 524, if desired by the customer. In the region of a cloud provider network 500, such volumes may be hosted on dedicated block store servers. However, due to the possibility of having a significantly smaller capacity at a provider substrate extension 502 than in the region, an optimal utilization experience may not be provided if the provider substrate extension includes such dedicated block store servers. Accordingly, a block storage service may be virtualized in the provider substrate extension 502, such that one of the VMs runs the block store software and stores the data of a volume 524. Similar to the operation of a block storage service in the region of a cloud provider network 500, the volumes 524 within a provider substrate extension 502 may be replicated for durability and availability. The volumes may be provisioned within their own isolated virtual network within the provider substrate extension 502. The compute instances 522 and any volumes 524 collectively make up a data plane extension 520B of the provider network data plane 516A within the provider substrate extension 502.

The servers within a provider substrate extension 502 may, in some implementations, host certain local control plane components 526, for example, components that enable the provider substrate extension 502 to continue functioning if there is a break in the connection back to the cloud provider network 500. Examples of these components include a migration manager that can move compute instances 522 between provider substrate extension servers if needed to maintain availability, and a key value data store that indicates where volume replicas are located. However, generally the control plane 518B functionality for a provider substrate extension will remain in the cloud provider network 500 in order to allow customers to use as much resource capacity of the provider substrate extension as possible.

Server software running at a provider substrate extension 502 may be designed by the cloud provider to run on the cloud provider substrate network, and this software may be enabled to run unmodified in a provider substrate extension 502 by using local network manager(s) 528 to create a private replica of the substrate network within the edge location (a "shadow substrate"). The local network manager (s) 528 can run on provider substrate extension 502 servers and bridge the shadow substrate with the provider substrate extension 502 network, for example, by acting as a virtual private network (VPN) endpoint or endpoints between the provider substrate extension 502 and the proxies 530, 532 in the cloud provider network 500 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 528 allow resources in the provider substrate extension 502 to seamlessly communicate with resources in the cloud provider network 500. In some implementations, a single local network manager can perform these actions for all servers hosting compute instances 522 in a provider substrate extension 502. In other implementations, each of the server hosting compute instances 522 may have a dedicated local network manager. In multi-rack edge locations, inter-rack communications can go through the local network managers, with local network managers maintaining open tunnels to one another.

Provider substrate extension locations can utilize secure networking tunnels through the provider substrate extension 502 network to the cloud provider network 500, for example, to maintain security of customer data when traversing the provider substrate extension 502 network and any other intermediate network (which may include the public internet). Within the cloud provider network 500, these tunnels are composed of virtual infrastructure components including isolated virtual networks (e.g., in the overlay network), control plane proxies 530, data plane proxies 532, and substrate network interfaces. Such proxies may be implemented as containers running on compute instances. In some embodiments, each server in a provider substrate extension 502 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some embodiments, a direct connection between a provider substrate extension 502 location and the cloud provider network 500 can be used for control and data plane communications. As compared to a VPN through other networks, the direct connection can provide constant bandwidth and more consistent network performance because of its relatively fixed and stable network path.

A control plane (CP) proxy 530 can be provisioned in the cloud provider network 500 to represent particular host(s) in an edge location. CP proxies are intermediaries between the control plane 514A in the cloud provider network 500 and control plane targets in the control plane 518B of provider substrate extension 502. That is, CP proxies 530 provide infrastructure for tunneling management API traffic destined for provider substrate extension servers out of the region substrate and to the provider substrate extension 502. For example, a virtualized computing service of the cloud provider network 500 can issue a command to a VMM of a server of a provider substrate extension 502 to launch a compute instance 522. A CP proxy maintains a tunnel (e.g., a VPN) to a local network manager 528 of the provider substrate extension. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 500. The one-way control plane traffic tunnel imposed by the CP proxies also prevents any (potentially compromised) devices from making calls back to the substrate. CP proxies may be instantiated one-for-one with servers at a provider substrate extension 502 or may be able to manage control plane traffic for multiple servers in the same provider substrate extension.

A data plane (DP) proxy 532 can also be provisioned in the cloud provider network 500 to represent particular server(s) in a provider substrate extension 502. The DP proxy 532 acts as a shadow or anchor of the server(s) and can be used by services within the cloud provider network 500 to monitor health of the host (including its availability, used/free compute and capacity, used/free storage and capacity, and network bandwidth usage/availability). The DP proxy 532 also allows isolated virtual networks to span provider substrate extensions 502 and the cloud provider network 500 by acting as a proxy for server(s) in the cloud provider network 500. Each DP proxy 532 can be implemented as a packet-forwarding compute instance or container. As illustrated, each DP proxy 532 can maintain a VPN tunnel with a local network manager 528 that manages traffic to the server(s) that the DP proxy 532 represents. This tunnel can be used to send data plane traffic between the provider substrate extension server(s) and the cloud provider network 500. Data plane traffic flowing between a provider substrate extension 502 and the cloud provider network 500 can be passed through DP proxies 532 associated with that provider substrate extension. For data plane traffic flowing from a provider substrate extension 502 to the cloud provider network 500, DP proxies 532 can receive encapsulated data plane traffic, validate it for correctness, and allow it to enter into the cloud provider network 500. DP proxies 532 can forward encapsulated traffic from the cloud provider network 500 directly to a provider substrate extension 502.

Local network manager(s) 528 can provide secure network connectivity with the proxies 530, 532 established in the cloud provider network 500. After connectivity has been established between the local network manager(s) 528 and the proxies, customers may issue commands via the interface 504 to instantiate compute instances (and/or perform other operations using compute instances) using provider substrate extension resources in a manner analogous to the way in which such commands would be issued with respect to compute instances hosted within the cloud provider network 500. From the perspective of the customer, the customer can now seamlessly use local resources within a provider substrate extension (as well as resources located in the cloud provider network 500, if desired). The compute instances set up on a server at a provider substrate extension 502 may communicate both with electronic devices located in the same network as well as with other resources that are set up in the cloud provider network 500, as desired. A local gateway 546 can be implemented to provide network connectivity between a provider substrate extension 502 and a network associated with the extension (e.g., a communications service provider network in the example of a provider substrate extension 542).

There may be circumstances that necessitate the transfer of data between the object storage service and a provider substrate extension 502. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE to minimize the impact of PSE-region latency on the customer's workloads. The object gateway can also temporarily store snapshot data from snapshots of volumes in the PSE and then sync with the object servers in the region when possible. The object gateway can also store machine images that the customer designates for use within the PSE or on the customer's premises. In some implementations, the data within the PSE may be encrypted with a unique key, and the cloud provider can limit keys from being shared from the region to the PSE for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot and machine image data using the PSE encryption key.

In the manner described above, the PSE forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A far zone may be connected in various ways to a publicly accessible network such as the Internet, for example directly, via another network, or via a private connection to a region. Although typically a far zone would have more limited capacity than a region, in some cases a far zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Figure 6:
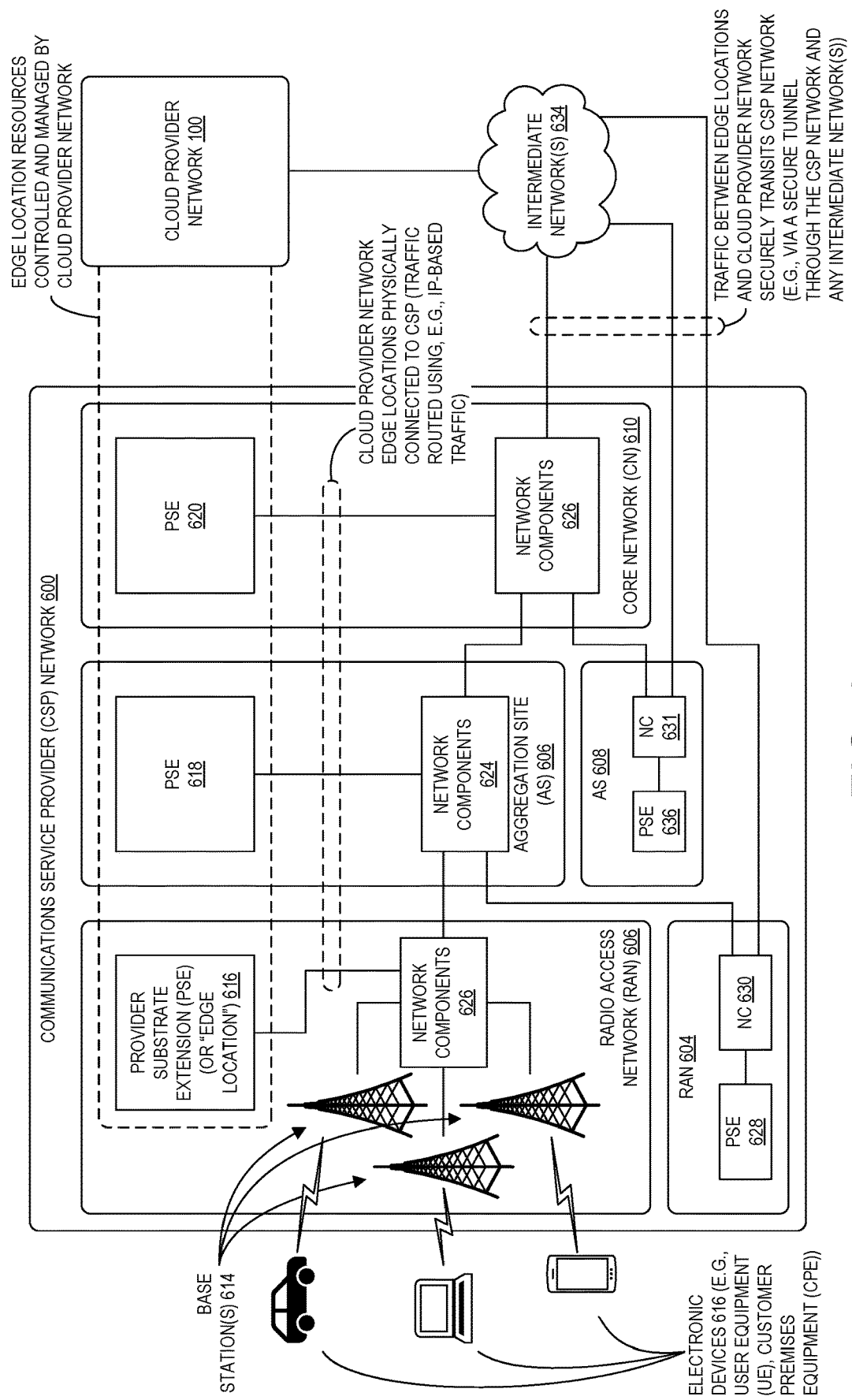
FIG. 6 illustrates an exemplary system in which cloud provider network substrate extensions are deployed within a communications service provider network according to some embodiments.

FIG. 6 illustrates an exemplary system in which cloud provider network edge locations are deployed within a communications service provider network according to some embodiments. A communications service provider (CSP) network 600 generally includes a downstream interface to end user electronic devices and an upstream interface to other networks (e.g., the internet). In this example, the CSP network 600 is a wireless "cellular" CSP network that includes radio access networks (RAN) 602, 604, aggregation sites (AS) 606, 608, and a core network (CN) 610. The RANs 602, 604 include base stations (e.g., NodeBs, eNodeBs, gNodeBs) that provide wireless connectivity to electronic devices such as electronic devices 612. The core network 610 typically includes functionality related to the management of the CSP network (e.g., billing, mobility management, etc.) and transport functionality to relay traffic between the CSP network and other networks. Aggregation sites 606, 608 can serve to consolidate traffic from many different radio access networks to the core network and to direct traffic originating from the core network to the various radio access networks.

From left to right in FIG. 6, end user electronic devices 612 wirelessly connect to base stations (or radio base stations) 614 of a radio access network 602. Such electronic devices 612 are sometimes referred to as user equipment (UE) or customer premises equipment (CPE). Data traffic is often routed through a fiber transport network consisting of multiple hops of layer 3 routers (e.g., at aggregation sites) to the core network 610. The core network 610 is typically housed in one or more data centers. For data traffic destined for locations outside of the CSP network 600, the network components 622-626 typically include a firewall through which traffic can enter or leave the CSP network 600 to external networks such as the internet or a cloud provider network 500. Note that in some embodiments, the CSP network 600 can include facilities to permit traffic to enter or leave from sites further downstream from the core network 610 (e.g., at an aggregation site or RAN).

Provider substrate extensions 616-620 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, provider substrate extensions 616, 618, and 620 are in communication with a cloud provider network 500.

Typically, the further—e.g., in terms of network hops and/or distance—a provider substrate extension is from the cloud provider network 500 (or closer to electronic devices 612), the lower the network latency is between computing resources within the provider substrate extension and the electronic devices 612. However, physical site constraints often limit the amount of provider substrate extension location computing capacity that can be installed at various points within the CSP or determine whether computing capacity can be installed at various points at all. For example, a provider substrate extension sited with the core network 610 can typically have a much larger footprint (in terms of physical space, power requirements, cooling requirements, etc.) than a provider substrate extension sited with the RAN 602, 604.

The installation or siting of provider substrate extensions within a CSP network can vary subject to the particular network topology or architecture of the CSP network. As indicated in FIG. 6, provider substrate extensions can generally be connected anywhere the CSP network can break out packet-based traffic (e.g., IP based traffic). Additionally, communications between a given provider substrate extension and the cloud provider network 500 typically securely transit at least a portion of the CSP network 600 (e.g., via a secure tunnel, virtual private network, a direct connection, etc.). In the illustrated example, the network components 622 facilitate the routing of data traffic to and from a provider substrate extension 616 integrated with the RAN 602, the network components 624 facilitate the routing of data traffic to and from an provider substrate extension 618 integrated with the AS 606, and the network components 626 facilitate the routing of data traffic to and from a provider substrate extension 620 integrated with the CN 610. Network components 622-626 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between a provider substrate extension 628 and the cloud provider network 500 can be broken out of the CSP network 600 without routing through the core network 610. For example, network components 630 of a RAN 604 can be configured to route traffic between a provider substrate extension 616 of the RAN 604 and the cloud provider network 500 without traversing an aggregation site or core network 610. As another example, network components 631 of an aggregation site 608 can be configured to route traffic between a provider substrate extension 632 of the aggregation site 608 and the cloud provider network 500 without traversing the core network 610. The network components 630, 631 can include a gateway or router having route data to direct traffic from the edge location destined for the cloud provider network 500 to the cloud provider network 500 (e.g., through a direct connection or an intermediate network 634) and to direct traffic from the cloud provider network 500 destined for the provider substrate extension to the provider substrate extension.

In some embodiments, provider substrate extensions can be connected to more than one CSP network. For example, when two CSPs share or route traffic through a common point, a provider substrate extension can be connected to both CSP networks. For example, each CSP can assign some portion of its network address space to the provider substrate extension, and the provider substrate extension can include a router or gateway that can distinguish traffic exchanged with each of the CSP networks. For example, traffic destined for the provider substrate extension from one CSP network might have a different destination IP address, source IP address, and/or virtual local area network (VLAN) tag than traffic received from another CSP network. Traffic originating from the provider substrate extension to a destination on one of the CSP networks can be similarly encapsulated to have the appropriate VLAN tag, source IP address (e.g., from the pool allocated to the provider substrate extension from the destination CSP network address space) and destination IP address.

Note that while the exemplary CSP network architecture of FIG. 6 includes radio access networks, aggregation sites, and a core network, the architecture of a CSP network can vary in naming and structure across generations of wireless technology, between different CSPs, as well as between wireless and fixed-line CSP networks. Additionally, while FIG. 6 illustrates several locations where an edge location can be sited within a CSP network, other locations are possible (e.g., at a base station).

Figure 7:
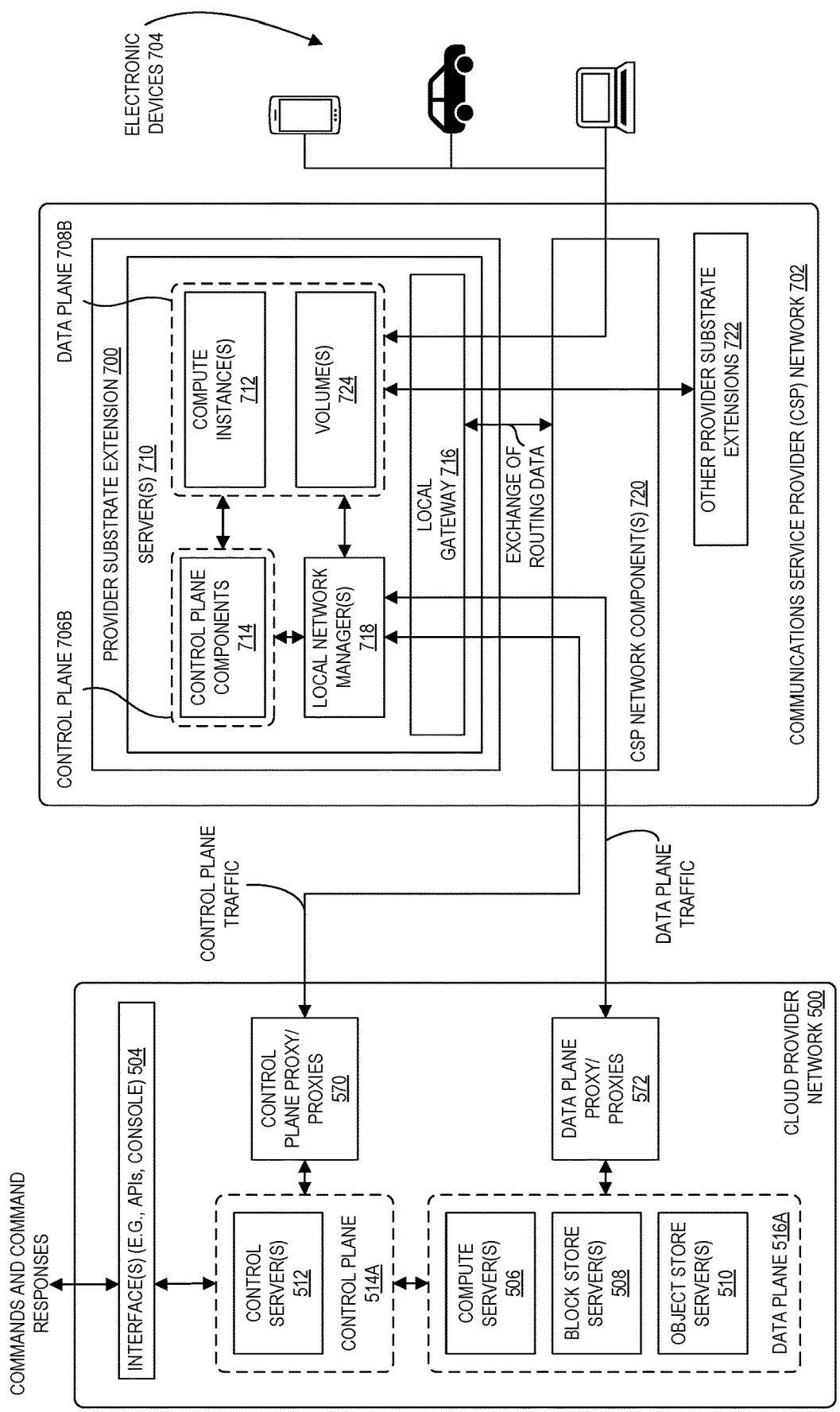
FIG. 7 illustrates in greater detail exemplary components of and connectivity between a provider substrate extension and a cloud provider network according to some embodiments.

FIG. 7 illustrates in greater detail exemplary components of and connectivity between a provider substrate extension associated with a communications service provider and a cloud provider network according to some embodiments. A provider substrate extension 700 provides resources and services of the cloud provider network within a CSP network 702 thereby extending functionality of the cloud provider network 500 to be closer to end user devices 704 connected to the CSP network.

The provider substrate extension 700 similarly includes a logical separation between a control plane 706B and a data plane 708B, respectively extending the control plane 514A and data plane 516A of the cloud provider network 500. The provider substrate extension 700 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers 710 can be provisioned by the cloud provider for deployment within the CSP network 702.

The servers 710 within a provider substrate extension 700 may, in some implementations, host certain local control plane components 714, for example, components that enable the provider substrate extension 700 to continue functioning if there is a break in the connection back to the cloud provider network 500. However, generally the control plane 706B functionality for a provider substrate extension 700 will remain in the cloud provider network 500 in order to allow customers to use as much resource capacity of the provider substrate extension as possible.

As illustrated, the provider substrate extension servers 710 can host compute instances 712. Compute instances can be VMs, or containers that package up code and all its dependencies so an application can run quickly and reliably across computing environments (e.g., including VMs). In addition, the servers 710 may host one or more data volumes 724, if desired by the customer. The volumes may be provisioned within their own isolated virtual network within the provider substrate extension 700. The compute instances 712 and any volumes 724 collectively make up a data plane extension 708B of the provider network data plane 516A within the provider substrate extension 700.

A local gateway 716 can be implemented to provide network connectivity between the provider substrate extension 700 and the CSP network 702. The cloud provider can configure the local gateway 716 with an IP address on the CSP network 702 and to exchange routing data (e.g., via the Border Gateway Protocol (BGP)) with the CSP network components 720. The local gateway 716 can include one or more route tables that control the routing of inbound traffic to the provider substrate extension 700 and outbound traffic leaving the provider substrate extension 700. The local gateway 716 can also support multiple VLANs in cases where the CSP network 702 uses separate VLANs for different portions of the CSP network 702 (e.g., one VLAN tag for the wireless network and another VLAN tag for a fixed network).

In some embodiments of a provider substrate extension 700, the extension includes one or more switches, sometimes referred to top of rack (TOR) switches (e.g., in rack-based embodiments). The TOR switches are connected to CSP network routers (e.g., CSP network components 720), such as Provider Edge (PE) or Software Defined Wide Area Network (SD-WAN) routers. Each TOR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 200 to add more peering links to an edge location without adjustments to routing. Each of the TOR switches can establish eBGP sessions with the carrier PE or SD-WAN routers. The CSP can provide a private Autonomous System Number (ASN) for the edge location and an ASN of the CSP network 702 to facilitate the exchange of routing data.

Data plane traffic originating from the provider substrate extension 700 can have a number of different destinations. For example, traffic addressed to a destination in the data plane 516A of the cloud provider network 500 can be routed via the data plane connection between the provider substrate extension 700 and the cloud provider network 500. The local network manager 718 can receive a packet from a compute instance 712 addressed to, for example, another compute instance in the cloud provider network 500 and encapsulate the packet with a destination as the substrate IP address of the server hosting the other compute instance before sending it to the cloud provider network 500 (e.g., via a direct connection or tunnel). For traffic from a compute instance 712 addressed to another compute instance hosted in another provider substrate extension 722, the local network manager 718 can encapsulate the packet with a destination as the IP address assigned to the other provider substrate extension 722, thereby allowing the CSP network components 720 to handle the routing of the packet. Alternatively, if the CSP network components 720 do not support inter-edge location traffic, the local network manager 718 can address the packet to a relay in the cloud provider network 200 that can send the packet to the other provider substrate extension 722 via its data plane connection (not shown) to the cloud provider network 500. Similarly, for traffic from a compute instance 712 address to a location outside of the CSP network 702 or the cloud provider network 500 (e.g., on the internet), if the CSP network components 720 permit routing to the internet, the local network manager 718 can encapsulate the packet with a source IP address corresponding to the IP address in the carrier address space assigned to the compute instance 712. Otherwise, the local network manager 718 can send the packet to an Internet Gateway in the cloud provider network 500 that can provide Internet connectivity for the compute instance 712. For traffic from a compute instance 712 addressed to an electronic device 704, the local gateway 716 can use Network Address Translation (NAT) to change the source IP address of the packet from an address in an address space of the cloud provider network to an address space of the carrier network.

The local gateway 716, local network manager(s) 718, and other local control plane components 714 may run on the same servers 710 that host compute instances 712, may run on a dedicated processor (e.g., on an offload card) integrated with edge location servers 710, or can be executed by servers separate from those that host customer resources.

Figure 8:
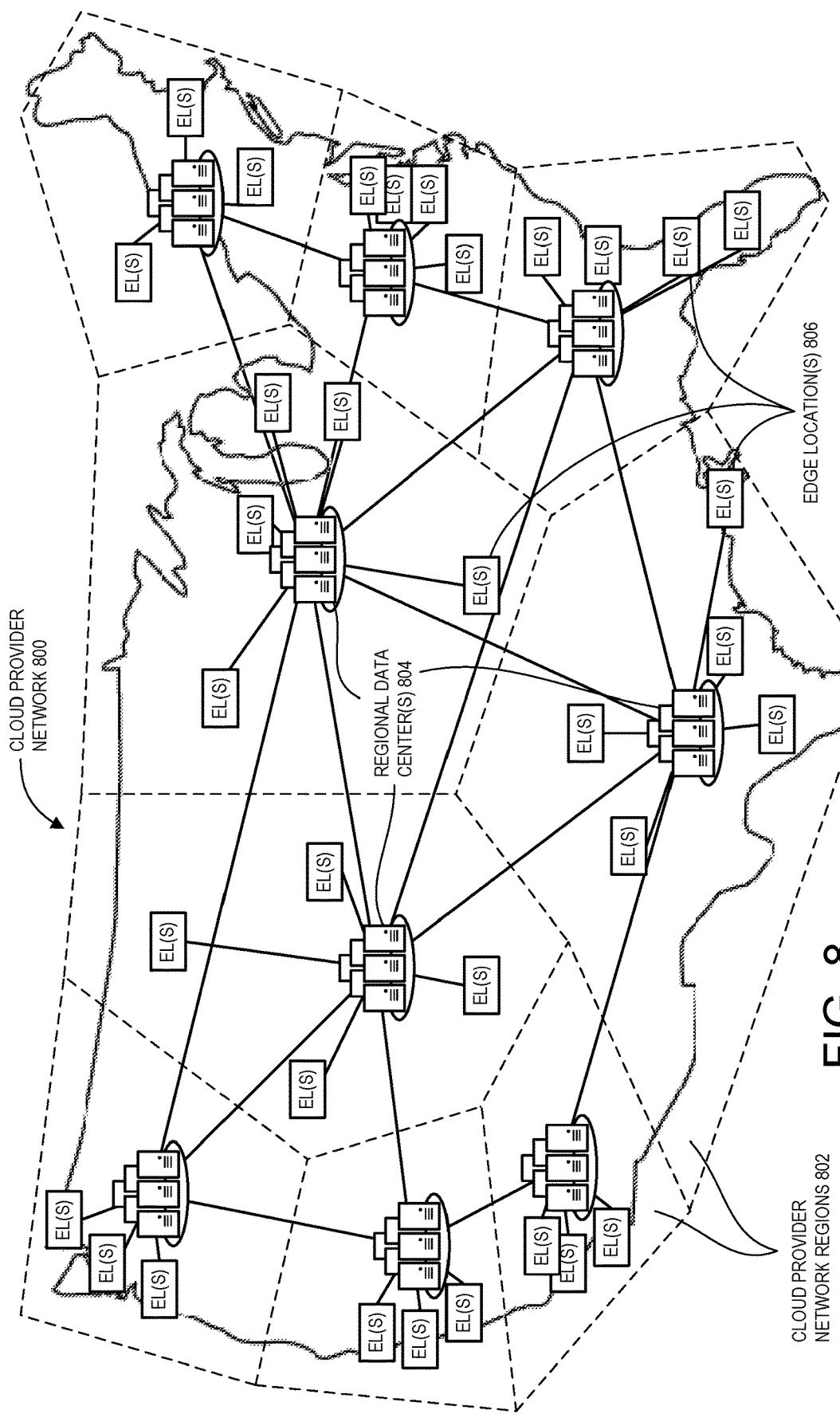
FIG. 8 illustrates an exemplary cloud provider network including provider substrate extensions according to some embodiments.

FIG. 8 illustrates an exemplary cloud provider network including provider substrate extension locations (or edge locations) according to some embodiments. As illustrated, a cloud provider network 800 can be formed as a number of regions 802, where a region is a separate geographical area in which the cloud provider has one or more data centers 804. Each region 802 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 806 can be much higher. Such widespread deployment of edge locations 806 can provide low-latency connectivity to the cloud for a much larger group of end user devices (in comparison to those that happen to be very close to a regional data center). In some embodiments, each edge location 806 can be peered to some portion of the cloud provider network 800 (e.g., a parent availability zone or regional data center). Such peering allows the various components operating in the cloud provider network 800 to manage the compute resources of the edge location. In some cases, multiple edge locations may be sited or installed in the same facility (e.g., separate racks of computer systems) and managed by different zones or data centers to provide additional redundancy.

An edge location 806 can be structured in several ways. In some implementations, an edge location 806 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as far zones (due to being far from other availability zones) or near zones (due to being near to customer workloads). A far zone may be connected in various ways to a publicly accessible network such as the Internet, for example directly, via another network, or via a private connection to a region. Although typically a far zone would have more limited capacity than a region, in some cases a far zone may have substantial capacity, for example thousands of racks or more.

Figure 9:
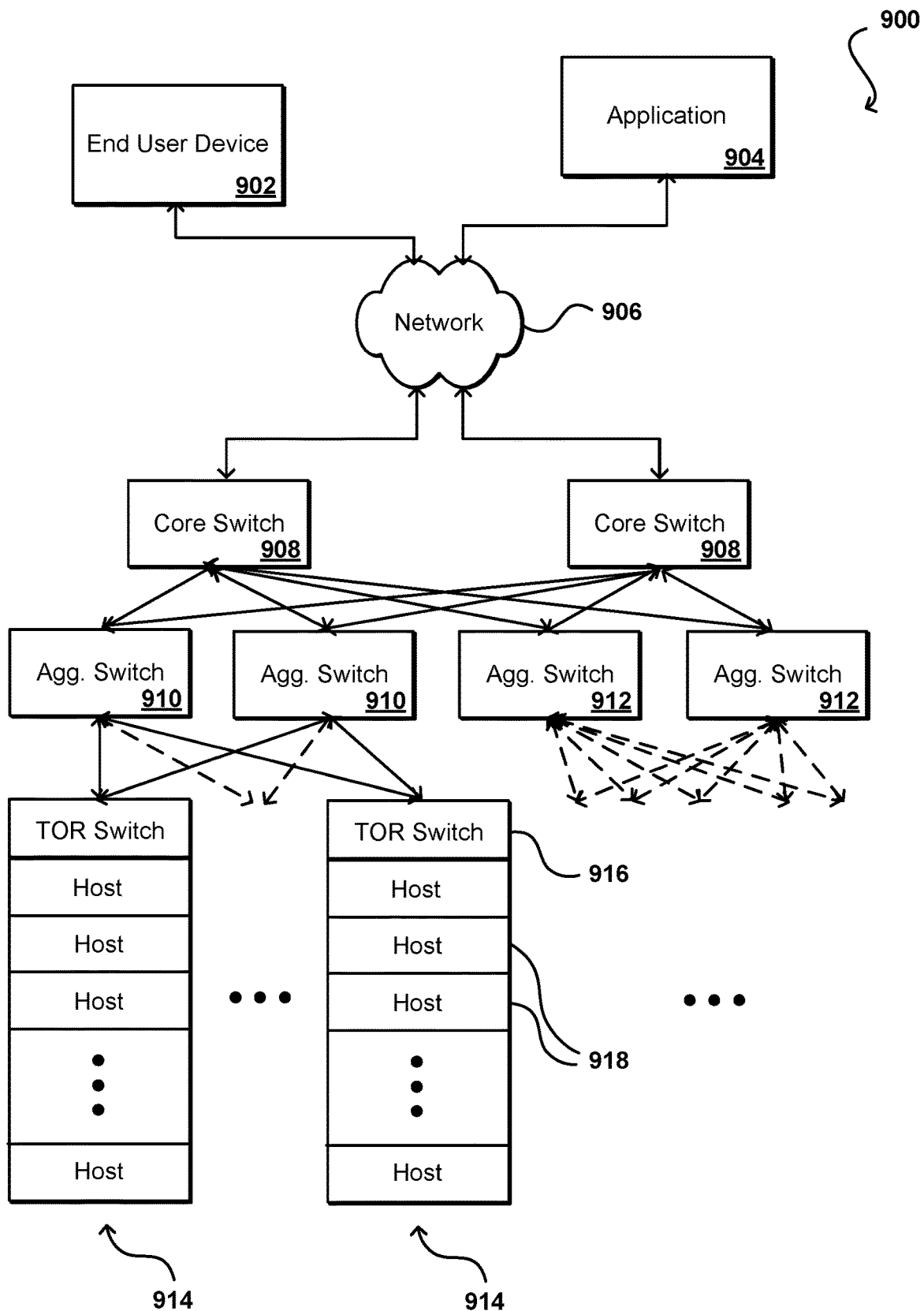
FIG. 9 illustrates components of an example data center that can be utilized in accordance with various embodiments.

FIG. 9 illustrates an example configuration 900 that represents a traditional hierarchical network design that can be used to route requests to specific host machines or other such devices, in order to provide users or applications with access to a variety of distributed resources. This example shows a typical design that can be used for a data center, wherein a source such as an end user device 902 or application 904 is able to send requests across a network 906, such as the Internet, to be received by one or more components of the data center. Properties of various components of the network, such as provisioned instances, etc., can be managed using at least one management system, component, or service 920. In this example, the requests are received over the network to one of a plurality of core switches 908, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 908 is able to communicate with each of a plurality of aggregation switches 910, 912, which in at least some embodiments are utilized in pairs. Utilizing aggregation switches in pairs provides a redundant capability in case one or the switches experiences a failure or is otherwise unavailable, such that the other device can route traffic for the connected devices. Each pair of aggregation switches 910, 912 is linked to a plurality of physical racks 914, each of which typically contains a top of rack (TOR) or "access" switch 916 and a plurality of physical host machines 918, such as data servers and other processing devices. As shown, each aggregation switch can be connected to a number of different racks, each with a number of host machines. The links between the layers can each comprise redundant links, or link pairs, with separate links for inbound and outbound traffic. If the network utilizes redundant 1 Gigabit Ethernet (GbE) links, for example, the total bandwidth per redundant link is 2 GbE.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as 120 racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 906. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 10:
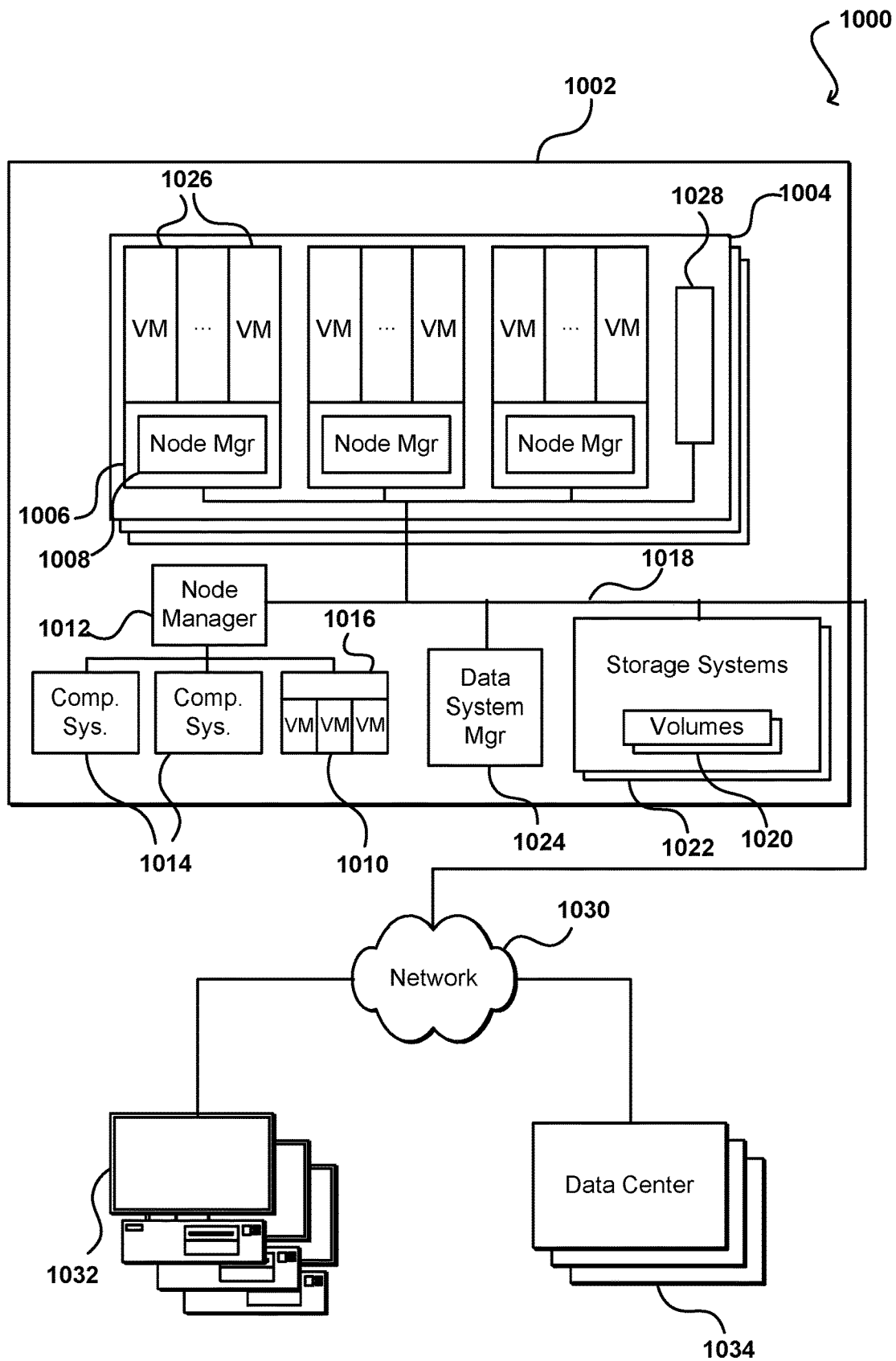
FIG. 10 illustrates components of an example virtualized resource environment that can be utilized in accordance with various embodiments.

FIG. 10 illustrates an example network configuration 1000 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 1002 includes a number of racks 1004, each rack including a number of host computing devices 1006, as well as an optional rack support computing system 1028 in this example embodiment. The host computing systems 1006 on the illustrated rack 1004 each host one or more virtual machines 1026 in this example, as well as a distinct node manager module 1012 associated with the virtual machines on that host computing system to manage those virtual machines. One or more other host computing systems 1016 may also each host one or more virtual machines 1010 in this example. Each virtual machine 1010 may act as an independent resource node for executing one or more program copies or performing another such action or process for user data requests, I/O operations, etc. In addition, this example data center 1002 further includes additional host computing systems 1014 that do not include distinct virtual machines, but may nonetheless each act as a resource node for one or more tasks being executed for a user. In this example, a node manager module 1012 executing on a computing system (not shown) distinct from the host computing systems 1014 and 1016 is associated with those host computing systems to manage the resource nodes provided by those host computing systems, such as in a manner similar to the node manager modules 1008 for the host computing systems 1006. The rack support computing system 1028 may provide various utility services for other computing systems local to its rack 1004 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 1002 also includes a computing system 1024 that executes a data storage system manager module for the block-based data storage service to assist in managing the availability of non-local block-based data storage to programs executing on resource nodes provided by the host computing systems located within the data center (or optionally on computing systems located in one or more other data centers 1034, or other remote computing systems 1032 external to the data center). In particular, in this example the data center 1002 includes a pool of multiple block-based data storage systems 1022, which each have local block-based storage for use in storing one or more volume copies 1020. Access to the volume copies 1020 is provided over the internal network(s) 1018 to programs executing on various resource nodes 1010 and 1014. As discussed in greater detail elsewhere, a block-based data storage system manager module 1024 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 1022 may coordinate with the node manager modules 1012, 1008 to manage use of volumes by programs executing on associated resource nodes, while in other embodiments the node manager modules may not be used to manage such volume use. In addition, in other embodiments, one or more system manager modules 1024 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 1022 (e.g., in a peer-to-peer manner, without any separate centralized system manager module on a computing system 1024).

In this example, the various host computing systems, server block data storage systems, and computing systems are interconnected via one or more internal networks 1018 of the data center, which may include various networking devices (e.g., routers, switches, gateways, etc.) that are not shown. In addition, the internal networks 1018 are connected to an external network 1030 (e.g., the Internet or another public data network) in this example, and the data center 1002 may further include one or more optional devices (not shown) at the interconnect between the data center and an external network (e.g., network proxies, load balancers, network address translation devices, etc.). In this example, the data center 1002 is connected via the external network 1030 to one or more other data centers 1034 that each may include some or all of the computing systems and storage systems illustrated with respect to data center 1002, as well as other remote computing systems 1032 external to the data center. The other computing systems 1032 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 10 has been simplified for the purposes of explanation, and that the number and organization of host computing systems, server block data storage systems and other devices may be much larger than what is depicted in FIG. 10. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 10 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 10, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetachVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 11:
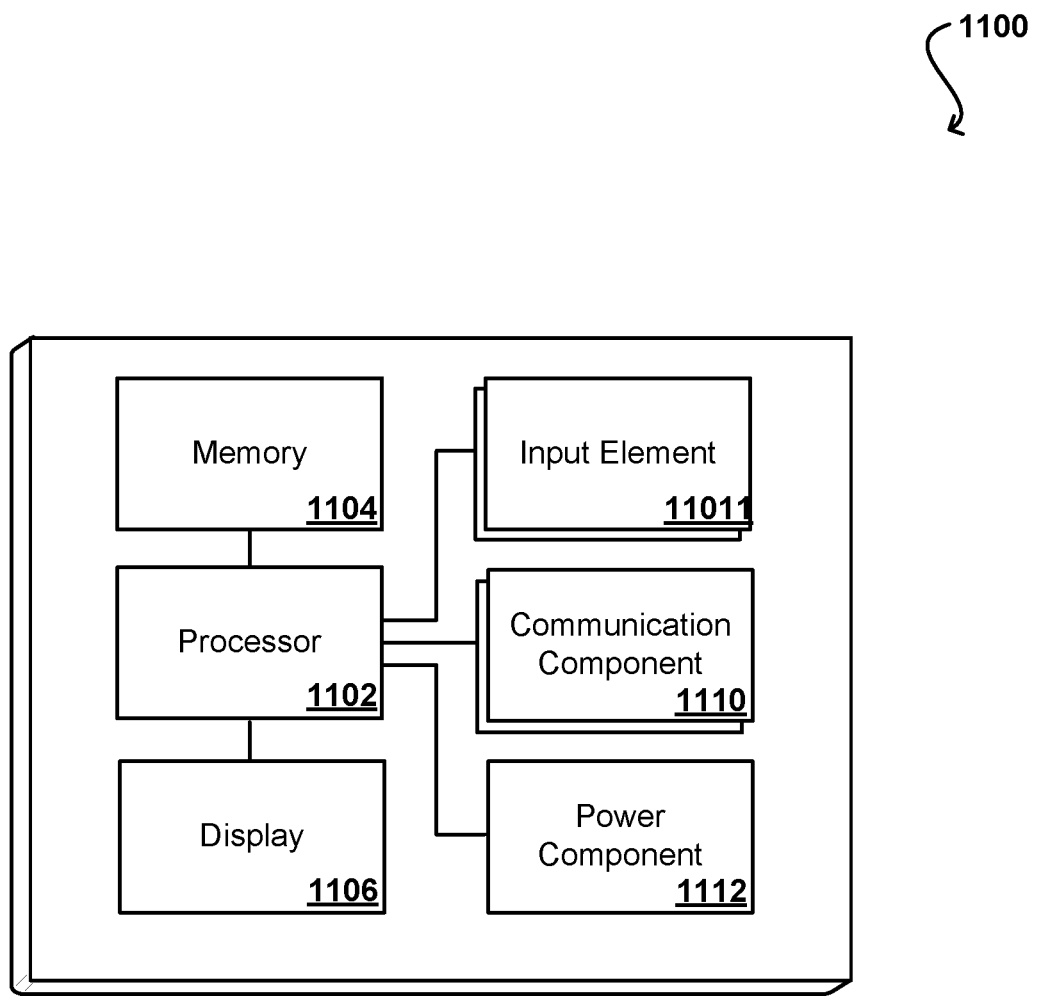
FIG. 11 illustrates components of an example computing device that can be used to perform aspects of the various embodiments.

FIG. 11 illustrates a logical arrangement of a set of general components of an example computing device 1100. In this example, the device includes a processor 1102 for executing instructions that can be stored in a memory device or element 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1106, such as a touch screen or liquid crystal display (LCD), although devices such as portable media players might convey information via other means, such as through audio speakers. As discussed, the device in many embodiments will include at least one input element 1108 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1100 of FIG. 11 can include one or more network interface or communication elements or components 1110 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 1112, such as power cords, power ports, batteries, wirelessly powered or rechargeable receivers, and the like.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   obtaining security data from a physical security device that is positioned in a third-party environment along with a secured deployment of computing resources;
   determining, based at least in part upon the security data, a security risk with respect to an impacted computing resource of the secured deployment;
   triggering, from a cloud provider that is remote from the third party environment, the impacted computing resource to remove an encryption key stored in the impacted computing resource based at least in part on the security risk; and
   causing the encryption key to be removed from the impacted computing resource, wherein data encrypted with the encryption key is unable to be decrypted on the impacted computing resource with the encryption key being removed.

2. The computer-implemented method of claim 1, further comprising:
   triggering, from outside the third party environment, a reboot of the impacted computing resource to cause the encryption key stored in volatile memory on the impacted computing resource to be removed.

3. The computer-implemented method of claim 1, further comprising:
   determining that the security risk has passed; and
   causing the encryption key to be sent to the impacted computing resource, wherein data encrypted with the encryption key is re-enabled to be decrypted on the impacted computing resource.

4. The computer-implemented method of claim 1, further comprising:
   providing the encryption key from a key management service.

5. The computer-implemented method of claim 1, further comprising:
   calculating a security score for the impacted computing resource using the security data; and
   determining that the security score falls outside an acceptable value range before causing the encryption key to be removed.

6. The computer-implemented method of claim 5, further comprising:
   calculating the security score based further upon at least one of physical security data, for an environment containing the secured deployment, or logical security data obtained from a logical security mechanism associated with the computing resource.

7. The computer-implemented method of claim 1, further comprising:
   causing a watchdog mechanism on a specified computing resource of the secured deployment to trigger a reboot of the specified computing resource in response to the watchdog mechanism failing to receive, from a key management service, an authorization for a respective encryption key within a specified period of time.

8. The computer-implemented method of claim 1, further comprising:
   enabling an entity associated with the impacted computing resource to configure the physical security device, a type of security risk for which to take an action, or an action to be taken for the type of security risk.

9. The computer-implemented method of claim 1, wherein security for an environment containing the secured deployment is managed by a third party, and wherein determining the security risk is performed outside the environment.

10. The computer-implemented method of claim 1, wherein the encryption key is stored in random access memory (RAM) or an internal register on the computing resource.

11. A system, comprising:
    at least one processor; and
    memory including instructions that, upon being executed by the at least one processor, cause the system to:
    obtain security data from a physical security device that is positioned in a third-party environment along with a secured deployment of computing resources;
    determine, based at least in part upon the security data, a security risk with respect to an impacted computing resource of the secured deployment;
    trigger, from a cloud provider that is remote from the third party environment, the impacted computing resource to remove an encryption key stored in the impacted computing resource based at least in part on the security risk; and
    cause the encryption key to be removed from the impacted computing resource, wherein data encrypted with the encryption key is unable to be decrypted on the impacted computing resource with the encryption key being removed.

12. The system of claim 11, wherein the instructions when executed further cause the system to:
    trigger, from outside the third party environment, a reboot of the impacted computing resource to cause the encryption key stored in volatile memory on the impacted computing resource to be removed.

13. The system of claim 11, wherein the instructions when executed further cause the system to:
    determine that the security risk has passed; and
    cause the encryption key to be sent to the impacted computing resource, wherein data encrypted with the encryption key is re-enabled to be decrypted on the impacted computing resource.

14. The system of claim 11, wherein the instructions when executed further cause the system to:
    provide the encryption key from a key management service external to the third party environment.

15. The system of claim 11, wherein the instructions when executed further cause the system to:
    calculate a security score for the impacted computing resource using the security data; and
    determine that the security score falls outside an acceptable value range before causing the encryption key to be removed.

* * * * *